United States Patent
Caldwell et al.

(10) Patent No.: US 9,951,852 B2
(45) Date of Patent: Apr. 24, 2018

(54) TORQUE CONVERTER STATOR INCLUDING POCKET

(71) Applicant: Schaeffler Technologies AG & Co. KG, Herzogenaurach (DE)

(72) Inventors: Carleton Caldwell, Wadsworth, OH (US); Aditya Dattawadkar, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 110 days.

(21) Appl. No.: 14/987,143

(22) Filed: Jan. 4, 2016

(65) Prior Publication Data

US 2017/0191555 A1 Jul. 6, 2017

(51) Int. Cl.
F16H 41/24 (2006.01)
F16D 41/066 (2006.01)

(52) U.S. Cl.
CPC .......... *F16H 41/24* (2013.01); *F16D 41/066* (2013.01); *F16H 2041/246* (2013.01)

(58) Field of Classification Search
None
See application file for complete search history.

(56) References Cited

U.S. PATENT DOCUMENTS

| 5,855,263 A | 1/1999 | Fergle | |
|---|---|---|---|
| 2008/0277223 A1* | 11/2008 | Liang | F16H 45/02 192/3.21 |
| 2009/0045023 A1* | 2/2009 | Uhler | F16H 45/02 192/3.29 |
| 2013/0126290 A1* | 5/2013 | Parameswaran | F16D 15/00 192/45.001 |
| 2015/0128582 A1* | 5/2015 | Kawamoto | F16D 41/12 60/345 |
| 2015/0308554 A1* | 10/2015 | Medellin | F16H 45/02 192/3.28 |
| 2016/0273635 A1* | 9/2016 | Dattawadkar | F16H 41/24 |
| 2016/0305524 A1* | 10/2016 | Resh | F16H 41/28 |

* cited by examiner

*Primary Examiner* — Jacob S. Scott
(74) *Attorney, Agent, or Firm* — Davidson, Davidson & Kappel, LLC

(57) ABSTRACT

A stator for a torque converter is provided. The stator includes a plurality of blades, a one-way clutch and a body supporting the blades. The body receives the one-way clutch therein and includes a pocket formed therein radially outside of the one-way clutch. A method of forming a torque converter is also provided. The method includes forming a pocket in a body of a stator. The stator includes a plurality of blades supported by the body. The body includes a recess radially inside of the pocket. The method also includes axially pressing an outer race of a one-way clutch into the recess. A torque converter is also provided.

13 Claims, 3 Drawing Sheets

TORQUE CONVERTER STATOR INCLUDING POCKET

The present disclosure relates generally to torque converters and more specifically to torque converter stators.

BACKGROUND

Torque converter stators are often designed such that an outer race of a one-way clutch is axially slidable into the stator body. Alternatively, U.S. Pat. No. 5,855,263 discloses a drop-in outer race.

SUMMARY OF THE INVENTION

A stator for a torque converter is provided. The stator includes a plurality of blades, a one-way clutch and a body supporting the blades. The body receives the one-way clutch therein and includes a pocket formed therein radially outside of the one-way clutch.

A torque converter is also provided. The torque converter includes a turbine, an impeller and the stator axially between the turbine and the impeller.

A method of forming a torque converter is also provided. The method includes forming a pocket in a body of a stator. The stator includes a plurality of blades supported by the body. The body includes a recess radially inside of the pocket. The method also includes axially pressing an outer race of a one-way clutch into the recess.

BRIEF DESCRIPTION OF THE DRAWINGS

The present invention is described below by reference to the following drawings, in which.

DETAILED DESCRIPTION

The disclosure provides a stator minimizing stator hat and brim deflection upon pressing in of an outer race into a stator by providing the stator with a pocket designed into the stator body casting in the region radially outward of the outer race. By incorporating a pocket, the design also helps to reduce weight and inertia for the torque converter.

Figure 1:
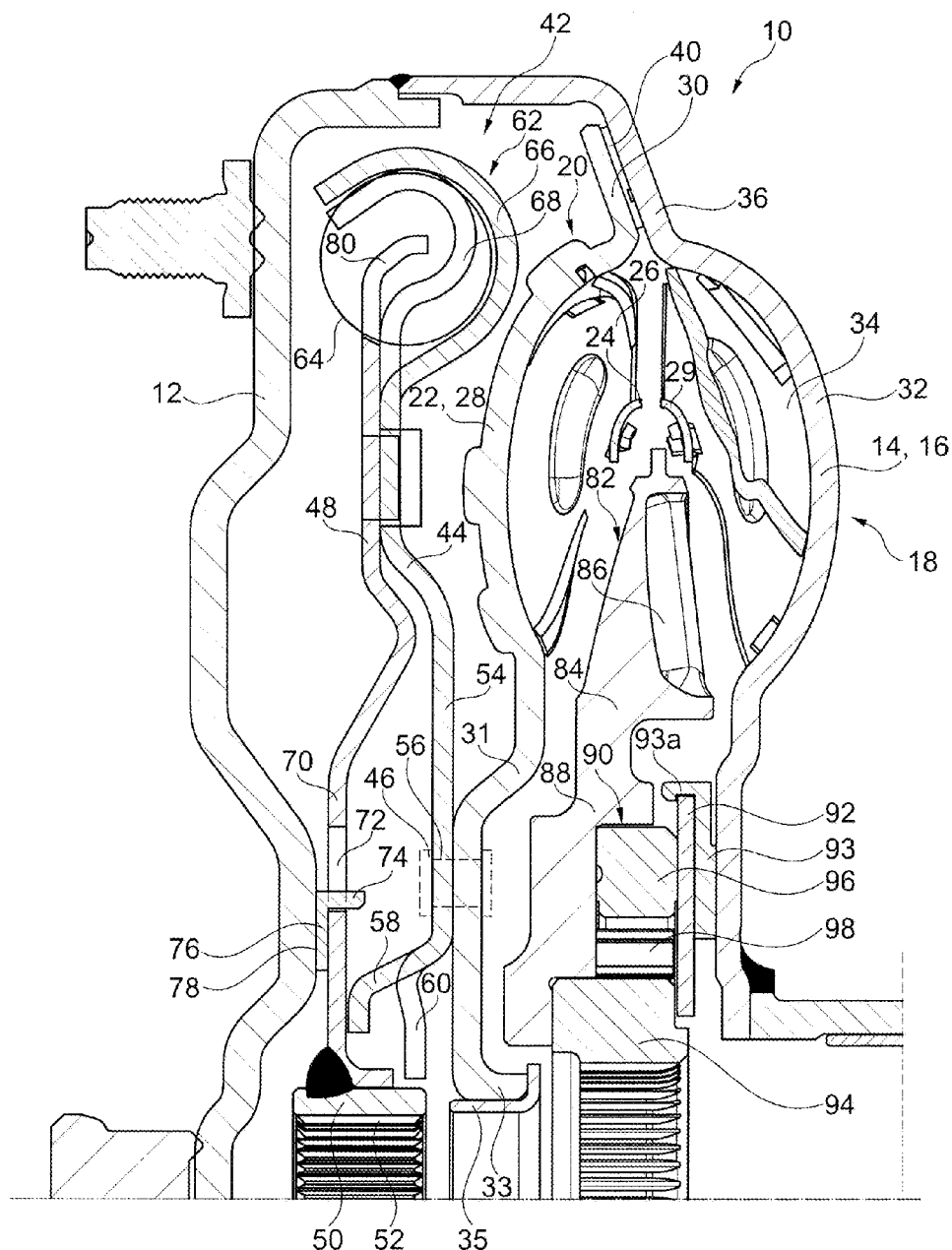
FIG. 1 schematically shows a cross-sectional side view of a torque converter in accordance with an embodiment of the present invention.

FIG. 1 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 that is configured as a piston such that turbine 20 is axially moveable toward and away from impeller 18 to engage and disengage impeller 18 so as to form a lockup clutch. Turbine 20 includes a turbine shell 22 and an inner ring 24 supporting a plurality of turbine blades 26 therebetween. Turbine shell 22 includes a rounded blade supporting portion 28 for supporting of turbine blades 26 at a front cover side of the blades 26. Radially outside of blade supporting portion 28, turbine shell 22 includes an outer radial extension 30 radially protruding outwardly from an outer circumference of blade supporting portion 28. Radially inside of blade supporting portion 28, turbine shell 22 includes an inner radial extension 31 that, at an inner radial end thereof, joins an axially extending inner circumferential section 33, whose inner circumferential surface contacts an outer circumferential surface of a hub 35. Impeller shell 16 includes a rounded blade supporting portion 32 that, along with a core ring 29, supports a plurality of impeller blades 34. Radially outside of blade supporting portion 32, impeller shell 16 includes a radially extending wall 36 radially protruding outwardly from an outer circumference of rounded blade supporting portion 32.

A friction material 40 is bonded onto a surface of outer radial extension 30 for engaging radially extending wall 36. In other embodiments, instead of or in addition to being bonded to outer radial extension 30, friction material 40 may be bonded to radially extending wall 36. A damper assembly 42 is positioned between front cover 12 and turbine 20 and is configured for transferring torque from turbine 20 to a transmission input shaft. Damper assembly 42 includes two plates—a first or turbine side plate 44, which is riveted to turbine 20 by rivets 46, and a second or front cover side plate 48, which is connected to a hub 50 having an inner splined surface 52 configured for connecting to a transmission input shaft.

First plate 44 includes a flat annular base section 54 provided with holes 56 axially extending therethrough for receiving rivets 46. Radially inside of base section 54, at a radially inner end thereof, first plate 44 splits into two sets of tabs 58, 60 that are axially and circumferentially offset from each other. At a radially outer end thereof, first plate 44 includes a spring retainer 62 configured for retaining arc springs 64. In this embodiment, damper assembly 42 includes arc shaped pockets 66, each for receiving one arc spring 64, with each arc shaped pocket 66 having an inner surface contoured to an outer surface of the corresponding arc spring 64. Circumferentially between pockets 66, radially outer end of first plate 44 includes overload stops 68. Each overload stop 68 is configured for contacting a circumferential edge of two arc springs 64 and is axially and radially offset with respect to pockets 66.

Second plate 48 includes a flat annular base section 70 provided with holes 72 axially extending therethrough for receiving a rivet tool used to form rivets 46 and for receiving posts 74 of an axial thrust washer 76, which limits the axial travel of damper assembly 42 and turbine 20 toward front cover 12 by contacting an inner radially extending surface 78 of front cover 12. At a radially outer end thereof, second plate 48 includes a plurality of circumferentially spaced driving tabs 80 configured for extending axially into spaces circumferentially between springs 64. During operation of torque converter 10, first plate 44 transfers torque from turbine 20 to second plate 48 via contact between circumferential edges of tabs 80 and circumferential edges of springs 64.

Outer radial extension 30 of turbine 20 engages impeller 18 at radially extending wall 36 via friction material 40 to transfer torque input into front cover 20 by the engine crankshaft to the transmission input shaft. As turbine 20 is driven by impeller 18, either through contact via friction material 40 and impeller shell 16 when the lockup clutch is locked or through fluid flow between blades 26, 34, turbine 20 transfers torque to damper assembly 42 via rivets 46. Damper assembly 42 in turn drives the transmission input shaft.

Torque converter 10 also includes a stator 82 axially between turbine 20 and impeller 18 to redirect fluid flowing from the turbine blades 26 before the fluid reaches impeller 18 to increase the efficiency of torque converter 10. Stator 82 includes stator casting 84 including a plurality of blades 86 and a stator body 88. Stator 82 also includes a one-way clutch 90 held within stator body 88 by a centering plate 92. An axial thrust washer 93, which is axially between stator 82 and impeller 18, is fixed to stator 82 at an outer circumference of centering plate 92 by a plurality of axially extending arms 93a, which are spaced circumferentially from each other. One-way clutch 90 includes an inner race 94, an outer race 96 and rollers 98 and springs 100 (FIG. 3) radially between inner race 94 and outer race 96. Stator casting 84 is rotationally fixed to outer race 96, and depending on the operating conditions of torque converter 10, inner race 94 and outer race 96 are rotationally fixed to each other or rotatable relative to each other. When impeller 18 rotates faster than turbine 20 and stator 82 is stationary, springs 100 (FIG. 3) circumferentially offset from rollers 98 press rollers 98 into wedged surfaces to rotationally fix inner and outer races 94, 96 together, preventing rotation of stator casting 84 and causing stator 82 to redirects the fluid flowing from turbine 20 to impeller 18. When impeller 18 and turbine 20 are rotating at substantially the same speed, inner race 94 and outer race 96 are rotatable relative to each other, and stator 82 rotates in same direction as impeller 18 and does not redirect the fluid flowing from turbine 20 to impeller 18.

Figure 2:
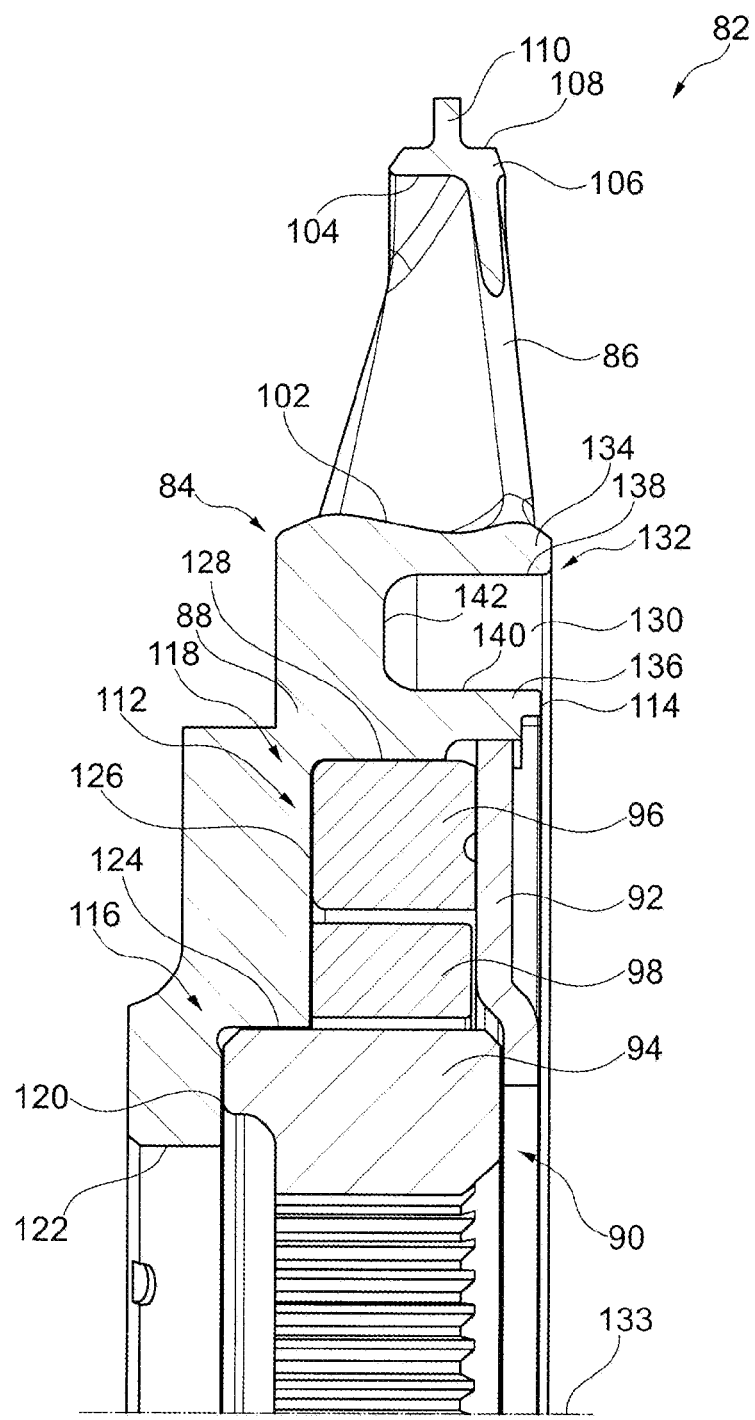
FIG. 2 shows enlarged a cross-sectional side view of a stator of the torque converter shown in FIG. 1 that is circumferentially offset from the view of the stator shown in FIG. 1.

FIG. 2 shows enlarged a cross-sectional side view of stator 82 that is circumferentially offset from the view of stator 82 shown in torque converter 10 in FIG. 1. Stator 82 includes blades 86 for redirecting the torque converter fluid supported radially between an outer circumferential surface 102 of stator body 88 and an inner circumferential surface 104 of a brim 106. On an outer circumferential surface 108 of brim 106, stator 82 includes a hat 110 protruding radially outward from 106 to define a radially outermost edge of stator 82. Stator body 88 includes an annular recess 112 formed in an impeller-side radially extending surface 114 thereof receiving one-way clutch 90. Annular recess 112 is defined by two step portions—a radially inner step portion 116 receiving inner race 94 and a radially outer step portion 118 receiving rollers 98 and outer race 96. Radially inner step portion 116 includes a radially extending surface 120 extending radially outward from an innermost circumferential surface 122 of stator casting 84 and an axially extending circumferential surface 124 extending from a radially outer edge of radially extending surface 120. Radially outer step portion 118 includes a radially extending surface 126 extending radially outward from axially extending circumferential surface 124 of step portion 116 and an axially extending circumferential surface 128 extending from a radially outer edge of radially extending surface 126.

Radially outside of annular recess 112, stator casting 84 is provided within pocket 132 defining an annular groove 130 within stator body 88. More specifically, pocket 132 is formed radially inside of outer circumferential surface 102 of stator body 88 and radially outside of axially extending circumferential surface 128, which defines an outermost circumferential surface of annular recess 112. Groove 130 extends circumferentially about a center axis 133 of stator 82 and extends axially from radially extending surface 114 of stator casting into stator body 88. Pocket 132 is defined by two axially protruding rings 134, 136 and includes an outer circumferential surface 138, an inner circumferential surface 140 and a radially extending surface 142 extending from outer circumferential surface 138 to inner circumferential surface 140.

During the assembly of stator 82, outer race 96 is pressed axially into annular recess 112, which can cause unpredictable deflection of brim 106 and hat 110. Pocket 132 is provided for reducing axial deflection of brim 106 and hat 110 by moving the deflection to pocket 132, which helps to prevent brim 106 and hat 110 from contacting core ring 24 of turbine 20 (FIG. 1). In another embodiment, recess 112 may be on the turbine side of stator 82, and pocket 132 is provided to help preventing brim 106 and hat 110 from contacting core ring 29 of impeller 18 (FIG. 1).

Figure 3:
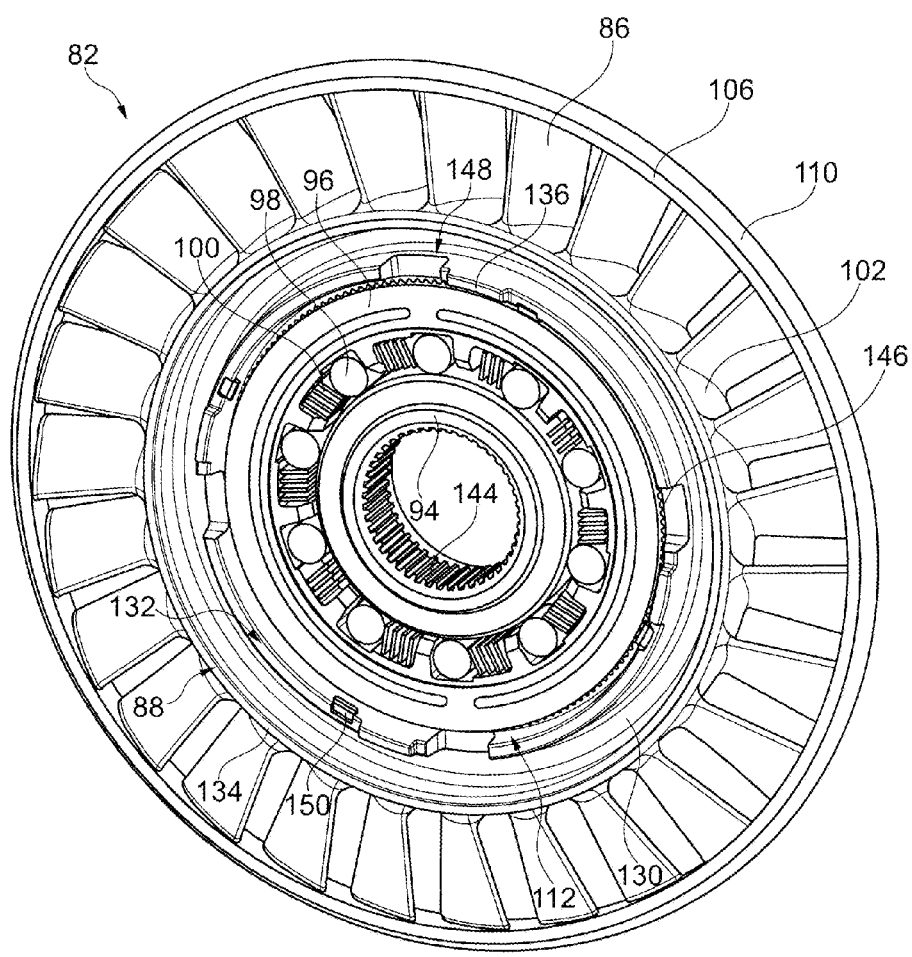
FIG. 3 schematically shows a perspective view of the stator.

FIG. 3 shows a perspective view of stator 82. As shown in FIG. 3, inner race 94 includes an inner splined surface 144 for connecting to a stator shaft and outer race 96 includes an outer splined surface 146 for connecting to circumferential surface 128 of annular recess 112. Brim 106 and hat 110 are both formed as rings, with brim 106 supporting radially outer ends of blades 86. Radially between races 94, 96, one-way clutch 90 includes a plurality of pairs of rollers 98 and springs 100 for rotatably fixing races 94, 96 together, as further described above. Pocket 132 is provided radially outside of outer race 96 and is defined by a radially outer axially protruding ring 134, which defines outer circumferential surface 102 of stator body 88 and is continuous, i.e., uninterrupted by spaces, and a radially inner axially protruding ring 136, which defines circumferential surface 128 and at radially extending surface 114 is not continuous, i.e., is interrupted by a plurality of notches 148 extending axially partially into ring 136 at radially extending surface 114. FIG. 1 provides a view along one of notches 148, while the view of FIG. 2 is circumferentially between two notches 148. Notches 148 are provided to each receive one respective arm 93a of thrust washer 93 (FIG. 1). Centering plate 92 (FIGS. 1, 2) is provided radially inside of axial protruding ring 136 contacting circumferential surface 128 and the centering plate is staked to the stator by pushing stator material in the ring 136 over the centering plate 92 in a region 150, then thrust washer 93 is snapped onto centering plate 92.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
   a turbine including a turbine core ring supporting turbine blades;
   an impeller including an impeller core ring supporting impeller blades; and
   a stator axially between the turbine and impeller, the stator comprising:
   a plurality of blades;
   a one-way clutch; and
   a body supporting the blades, the body receiving the one-way clutch therein, the body including a pocket formed therein radially outside of the one-way clutch, wherein the stator includes a brim connected to radially outer ends of the blades and a hat protruding radially outward from the brim, the brim being positioned axially between the impeller core ring and the turbine core ring, the pocket being configured to reduce axial deflection of the brim and the hat to help prevent the brim and the hat from deflecting into the turbine core ring or the impeller core ring when an outer race of the one-way clutch is pressed axially into the body, the turbine being axially movable to frictionally engage the impeller.

2. The torque converter as recited in claim 1 wherein the body includes a radially outer axially protruding ring defining an outer circumferential surface of the body and a radially inner axially protruding ring defining a circumferential surface of a recess in the body, the recess receiving the one-way clutch of the stator, the radially outer axially protruding ring and the radially inner axially protruding ring defining the pocket, the pocket defining an annular groove surrounding the recess.

3. The torque converter as recited in claim 2 wherein the one-way clutch includes an outer race, the outer race being rotationally fixed to the body at the circumferential surface of the recess.

4. The torque converter as recited in claim 3 further comprising a centering plate holding the one-way clutch in the recess, the centering plate contacting the circumferential surface of the recess.

5. The torque converter as recited in claim 2 wherein the radially inner axially protruding ring includes a plurality of notches formed therein extending axially into the radially inner axially protruding ring at a radially extending surface of the radially inner axially protruding ring.

6. A torque converter comprising:
a turbine including a turbine core ring supporting turbine blades;
an impeller including an impeller core ring supporting impeller blades; and
a stator axially between the turbine and impeller, the stator comprising:
a plurality of blades;
a one-way clutch; and
a body supporting the blades, the body receiving the one-way clutch therein, the body including a pocket formed therein radially outside of the one-way clutch, wherein the stator includes a brim connected to radially outer ends of the blades and a hat protruding radially outward from the brim, the brim being positioned axially between the impeller core ring and the turbine core ring, the pocket being configured to reduce axial deflection of the brim and the hat to help prevent the brim and the hat from deflecting into the turbine core ring or the impeller core ring when an outer race of the one-way clutch is pressed axially into the body; and
a thrust washer, the body of the stator including a radially outer axially protruding ring defining an outer circumferential surface of the body and a radially inner axially protruding ring defining a circumferential surface of a recess in the body, the recess receiving the one-way clutch of the stator, the radially outer axially protruding ring and the radially inner axially protruding ring defining the pocket, the pocket defining an annular groove surrounding the recess, the radially inner axially protruding ring includes a plurality of notches formed therein extending axially into the radially inner axially protruding ring at a radially extending surface of the radially inner axially protruding ring, the thrust washer extending into the notches.

7. The torque converter as recited in claim 6 wherein the turbine is axially movable to frictionally engage the impeller.

8. A method of forming a torque converter comprising:
forming a pocket in a body of a stator, the stator including a plurality of blades supported by the body, the body including a recess radially inside of the pocket, the forming the pocket includes forming a radially outer axially protruding ring defining an outer circumferential surface of the body and a radially inner axially protruding ring defining a circumferential surface of the recess in the body, the radially outer axially protruding ring and the radially inner axially protruding ring defining the pocket such that the pocket defines an annular groove surrounding the recess, the radially inner axially protruding ring is formed to include a plurality of notches formed therein extending axially into the radially inner axially protruding ring at a radially extending surface of the radially inner axially protruding ring;
axially pressing an outer race of a one-way clutch into the recess; and
inserting arms of a thrust washer into the notches.

9. The method as recited in claim 8 further comprising fixing a centering plate to the body to hold the one-way clutch in the recess, the inserting of the arms of the thrust washer into the notches including fixing the arms of the thrust washer to the centering plate.

10. The method as recited in claim 8 wherein the torque converter includes a turbine including a turbine core ring supporting turbine blades and an impeller including an impeller core ring supporting impeller blades, the stator includes a brim connected to radially outer ends of the blades and a hat protruding radially outward from the brim the method including providing the stator adjacent to one of the turbine and the impeller such that the hat is aligned with one of the turbine core ring and the impeller core ring, the pocket reducing axial deflection of the brim and the hat to help prevent the brim and the hat from deflecting into the one of the turbine core ring and the impeller core ring when the outer race of the one-way clutch is pressed axially into the body.

11. The method as recited in claim 8 wherein the axially pressing an outer race of a one-way clutch into the recess includes rotationally fixing the outer race to the body at a circumferential surface of the recess.

12. The method as recited in claim 8 further comprising fixing a centering plate to the body to hold the outer race in the recess, the centering plate contacting the circumferential surface of the recess.

13. The method as recited in claim 8 wherein the thrust washer is fixed to the centering plate by the inserting of the arms of the thrust washer into the notches.

* * * * *